(12) United States Patent
Tajima

(10) Patent No.: US 7,688,418 B2
(45) Date of Patent: Mar. 30, 2010

(54) LIQUID CRYSTAL DISPLAY PANEL

(75) Inventor: Kenichi Tajima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/711,604

(22) Filed: Sep. 28, 2004

(65) Prior Publication Data

US 2005/0068488 A1    Mar. 31, 2005

(30) Foreign Application Priority Data

Sep. 30, 2003    (JP)    ............... 2003-340751

(51) Int. Cl.
G02F 1/13    (2006.01)
G02F 1/1339    (2006.01)

(52) U.S. Cl. .................. 349/187; 349/153; 349/190

(58) Field of Classification Search ......... 349/153–154, 349/190, 187
See application file for complete search history.

(56) References Cited

U.S. PATENT DOCUMENTS 6,970,227 B2 * 11/2005 Kida et al. .................. 349/190

2004/0105065 A1 * 6/2004 Jung et al. .................. 349/153
2006/0176439 A1 * 8/2006 Tashiro et al. ............... 349/190

FOREIGN PATENT DOCUMENTS

| JP | 06-235925 | 8/1994 |
| JP | 2001222017 A | 8/2001 |
| JP | 2001-281678 | 10/2001 |
| JP | 2001281678 A | 10/2001 |
| JP | 2002-107740 | 4/2002 |
| JP | 2002-156638 | 5/2002 |
| JP | 2003233330 A | 8/2003 |

* cited by examiner

*Primary Examiner*—Dung T. Nguyen
(74) *Attorney, Agent, or Firm*—James J. Cioffi; Joseph Petrokaitis

(57) ABSTRACT

A method of manufacturing a liquid crystal display panel where a image display cell region and a plurality of dummy cell regions are provided on a glass substrate. The dummy cells are formed to monitor the internal pressure of liquid crystal sealed in the image display cell region. Liquid crystal is dropped on the image display cell region and the dummy cell regions and the glass substrate and a second substrate are bonded together. The image display cell and the dummy cells, which have the liquid crystal sealed therein, are formed in the image display cell region and the dummy cell regions, respectively. Based on the results of monitoring states of the dummy cells thus formed, a state of the image display cell is estimated.

7 Claims, 4 Drawing Sheets

Fig. 3
(a)
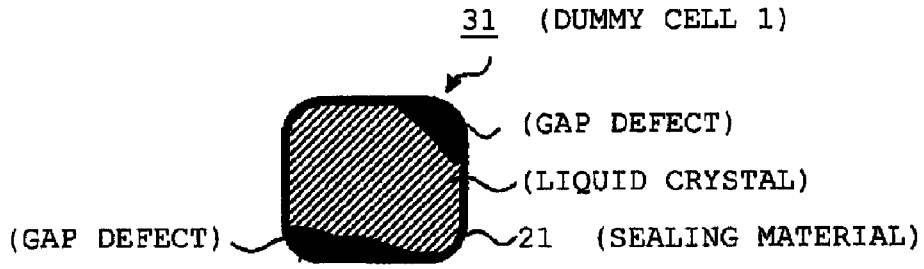
(b)
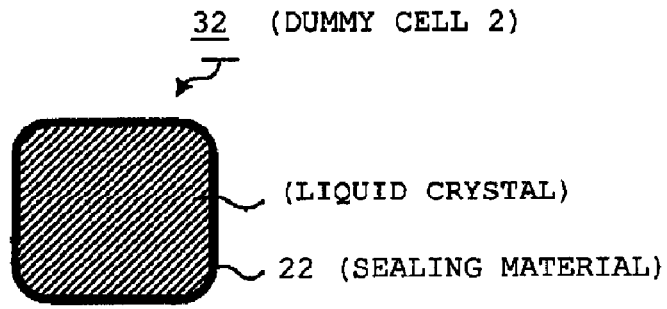
(c)
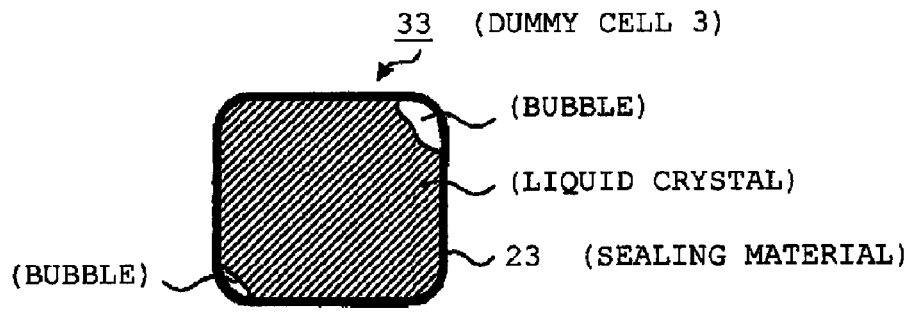
(d)
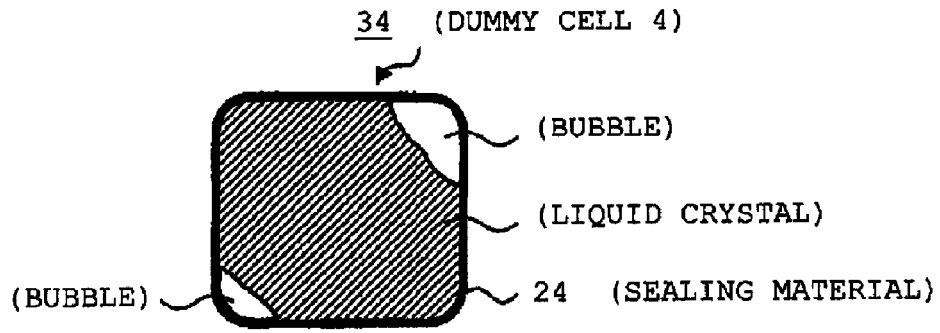

LIQUID CRYSTAL DISPLAY PANEL

BACKGROUND OF THE INVENTION

The present invention relates to a method of manufacturing a liquid crystal display panel. More specifically, the present invention relates to a method of manufacturing a high-quality liquid crystal display panel, in which proper internal pressure of a cell is maintained by a One-Drop-Fill (ODF) method.

Usually, a process of manufacturing an active matrix color liquid crystal display device using thin-film transistors (TFTs) as switching elements includes an array step of forming a wiring pattern, the switching elements on a glass substrate, a cell step of forming a liquid crystal display panel by arranging spacers between the glass substrate and a glass substrate opposite thereto and sealing liquid crystal between the glass substrates, and a module step of performing attachment of a driver IC, and mounting of a backlight. Among these steps, in the substep of arranging the spacers in the cell step, columnar spacers are formed on one or both of the opposite substrates, and a cell gap (cell thickness) between the opposite glass substrates is constantly maintained.

In recent years, a One-Drop-Fill (ODF) method has received attention in a process of injecting the liquid crystal. This One-Drop-Fill (ODF) method is, for example, a method in which a specified amount of liquid crystal is dropped on a surface of the array substrate, which is surrounded by a main seal formed in a periphery of the array substrate, the array substrate and the opposite substrate are bonded together in vacuum, and the liquid crystal is sealed therebetween. Conventionally, a vacuum injection method has been widely used. In the vacuum injection method, the array substrate on which the TFTs are formed, and the opposite substrate opposite thereto, on which color filters (CFs) are formed, are bonded together with a sealing material interposed therebetween, and then the liquid crystal is sealed between the substrates. As compared with this vacuum injection method, the One-Drop-Fill method as described above has the potential to reduce the manufacturing cost of the liquid crystal display panel and to improve mass productivity thereof because the time required for injecting the liquid crystal can be shortened.

In the case of manufacturing the liquid crystal display panel by this One-Drop-Fill method, in order to obtain a proper cell gap, it is important to align the columnar spacers evenly and to drop a predetermined amount of the liquid crystal in accordance with height and hardness of the columnar spacers. When the amount of liquid crystal gets out of balance, for example, when the amount of liquid crystal is too large, a defect of uneven gravity occurs in the liquid crystal in a cell. Alternatively, when the amount of liquid crystal is too small, foaming at low temperature and unevenness in black display, which is inherent in IPS (In-Plane-Switching liquid crystal), occur in the liquid crystal in the cell. It is known that malfunctions caused by such defects occur.

There are a number of methods proposed by others to address these defects. Japanese Patent Laid-Open No. 2002-107740, the disclosure of which is incorporated by reference herein, provides a method of measuring the drop amount of liquid crystal and collecting the liquid crystal when the amount is improper.

Japanese Patent Laid-Open No. 2001-281678, the disclosure of which is incorporated by reference herein, provides a method of measuring the height of the columnar spacers in advance by a laser displacement meter.

Japanese Patent Laid-Open No. H6-235925 (published in 1994) and Japanese Patent Laid-Open No. 2002-156638, the disclosure of which is incorporated by reference herein, provides a method of discharging the excessive liquid crystal from an opening provided on a part of the seal after the end of the ODF process, thus obtaining proper internal pressure of a cell.

It has been possible to control the amount of liquid crystal in the cell with a precision of approximately ±0.5% due to improvements in manufacturing and inspection tools. Notwithstanding this, there are still deficiencies in the prior art. When consideration is made for changes of specific gravity and viscosity of the liquid crystal due to a temperature change, a coating thickness of a film surface of the substrate, it has been very difficult to accurately adjust the amount of liquid crystal and to maintain the internal pressure of the cell at proper pressure. From such a viewpoint, for example, the method of measuring the drop amount of liquid crystal and collecting the unrequired amount of liquid crystal, as described in Japanese Patent Laid-Open No. 2002-107740, is not realistic.

Moreover, the method of measuring the height of the columnar spacers, as described in Japanese Patent Laid-Open No. 2001-281678, has problems. First, it is difficult to detect transparent columnar spacers by means of white-light interferometry or the like. Second, it is difficult to measure columnar spacers having tilted portions, and to automate the measurement. Accordingly, a large number of points cannot be measured rapidly. Next, the method of discharging the excessive liquid crystal after the end of the ODF process requires apparatuses for pressurization and sealing. Even if the apparatuses are actually used, it is difficult to obtain the proper gap. Furthermore, there emerge problems regarding a tact time and quality of a sealing port.

Furthermore, the columnar spacers are usually prepared by a photolithography technology by using photosensitive resin, and accordingly, it is difficult to control the height of the columnar spacers within a range where variations are small (for example, within a range of plus or minus several percent). Moreover, it is difficult to measure the height of the columnar spacers for each substrate in terms of measurement precision, variations depending on individual products and a measurement frequency. Typically, only one piece per several tens of pieces are sampled, and only values obtained by measuring several points on each sampled surface are used.

Furthermore, it is under these circumstances that measurement of hardness (elasticity/plasticity) of the columnar spacers or a shape thereof, and adjustment of the amount of liquid crystal sealed between the substrates based on the measurement values of the hardness or shape are performed. It is extremely difficult to timely detect, in the cell step, malfunctions based on the causes as described above, which occur in the liquid crystal panel, and there is a possibility that the defects may occur after shipment of the product. Therefore, there is a need for improved methods to solve the above described deficiencies.

BRIEF SUMMARY OF THE INVENTION

The present invention discloses a method to address the problems described above. It is an object of the present invention to provide a method of manufacturing a high-quality display panel in which proper internal pressure of a cell is maintained in a manner that a drop amount of liquid crystal is timely adjusted in accordance with height and hardness of columnar spacers constituting a cell gap between glass substrates opposite to each other in a process of manufacturing the liquid crystal display panel by means of a One-Drop-Fill method.

It is another object of the present invention to provide an intermediate member for manufacturing the liquid crystal display panel, which is for use in manufacturing the high-quality liquid crystal display panel in which the proper internal pressure of the cell is maintained.

Accordingly, in the present invention, a plurality of cells having liquid crystal sealed therein for monitoring internal pressure of liquid crystal sealed in an image display cell are provided on the same substrate as for the image display cell.

Specifically, the present invention provides a method of manufacturing a liquid crystal display panel, the method comprising the steps of: providing an image display cell region on a first substrate and at least one dummy cell region in a periphery of the image display cell region; dropping liquid crystal in the image display cell region and the dummy cell region; bonding together the first substrate and a second substrate; forming an image display cell and a dummy cell in the image display cell region and the dummy cell region, respectively, the image display cell and the dummy cell having the liquid crystal sealed therein; and estimating a state of the image display cell based on a state of the dummy cell thus formed.

In this case, if the method is characterized in that the state of the image display cell is estimated based on states of a plurality of the dummy cells, a more sensitive estimation can be performed. In order to estimate the state of the image display cell, the method is characterized in that the state of the image display cell is estimated based on whether or not there is a bubble occurring in the dummy cells or on a color change of the liquid crystal sealed in the dummy cells. It is therefore possible to estimate an optimum amount of the liquid crystal sealed in the image display cell based on the aforementioned states of the dummy cells, and thereby the quality of product control in manufacturing the liquid crystal display panel in a subsequent step can be improved.

Moreover, it is preferable that the image display cell region be formed on a portion of a product area on the first substrate, and that the dummy cell region be formed on a portion on the first substrate, which is other than the portion of the product area and cut by a cutting step. Furthermore, it is preferable that the dummy cell region have an area in which one shot of the liquid crystal corresponds to a coating amount of the liquid crystal on the dummy cell region.

The present invention also provides a member for a liquid crystal display panel formed by bonding together a first substrate and a second substrate and by sealing liquid crystal in a gap between the first substrate and the second substrate, the member comprising: an image display cell on which an image is displayed by the liquid crystal, which is formed on a substantial center portion of the first and second substrates; and a dummy cell for inspecting a state where the liquid crystal is sealed in the image display cell, which is formed in a periphery of the image display cell.

It is preferable that a plurality of the dummy cells be provided in the periphery of the image display cell. Moreover, if the member is characterized in that the plurality of dummy cells have areas different from one another, precision for monitoring the states of the dummy cells can be improved. Furthermore, if the method is characterized in that both of the image display cell and the dummy cells are formed by a similar pixel design, monitoring of the states of the dummy cells makes it possible to easily estimate the state of the image display cell, and eventually, makes it possible to adjust a drop amount of liquid crystal dropped on the image display cell in a subsequent step.

The present invention further provides a member for a liquid crystal display panel formed by sealing liquid crystal in a gap between a first substrate and a second substrate, the member comprising: an image display cell formed on a substantial center portion of the first and second substrates; and a plurality of cells having liquid crystal sealed therein and having areas different from one another, which are formed in a portion other than a portion of the image display cell.

If the member is characterized in that amounts of the sealed liquid crystal in the plurality of cells having the liquid crystal sealed therein are equal to one another, the monitoring of the states of the cells having the liquid crystal sealed therein makes it possible to estimate the state of the image display cell.

The present invention provides a method of manufacturing a high-quality liquid crystal display panel in which proper internal pressure of a cell is maintained in a manner that a drop amount of liquid crystal is timely adjusted in accordance with height and hardness of columnar spacers.

BRIEF DESCRIPTION OF THE DRAWINGS

For a more complete understanding of the present invention and the advantages thereof, reference is now made to the following description taken in conjunction with the accompanying drawings.

FIGS. 3(a) to 3(d) are views for explaining states of dummy cells.

DETAILED DESCRIPTION OF THE INVENTION

Figure 1:
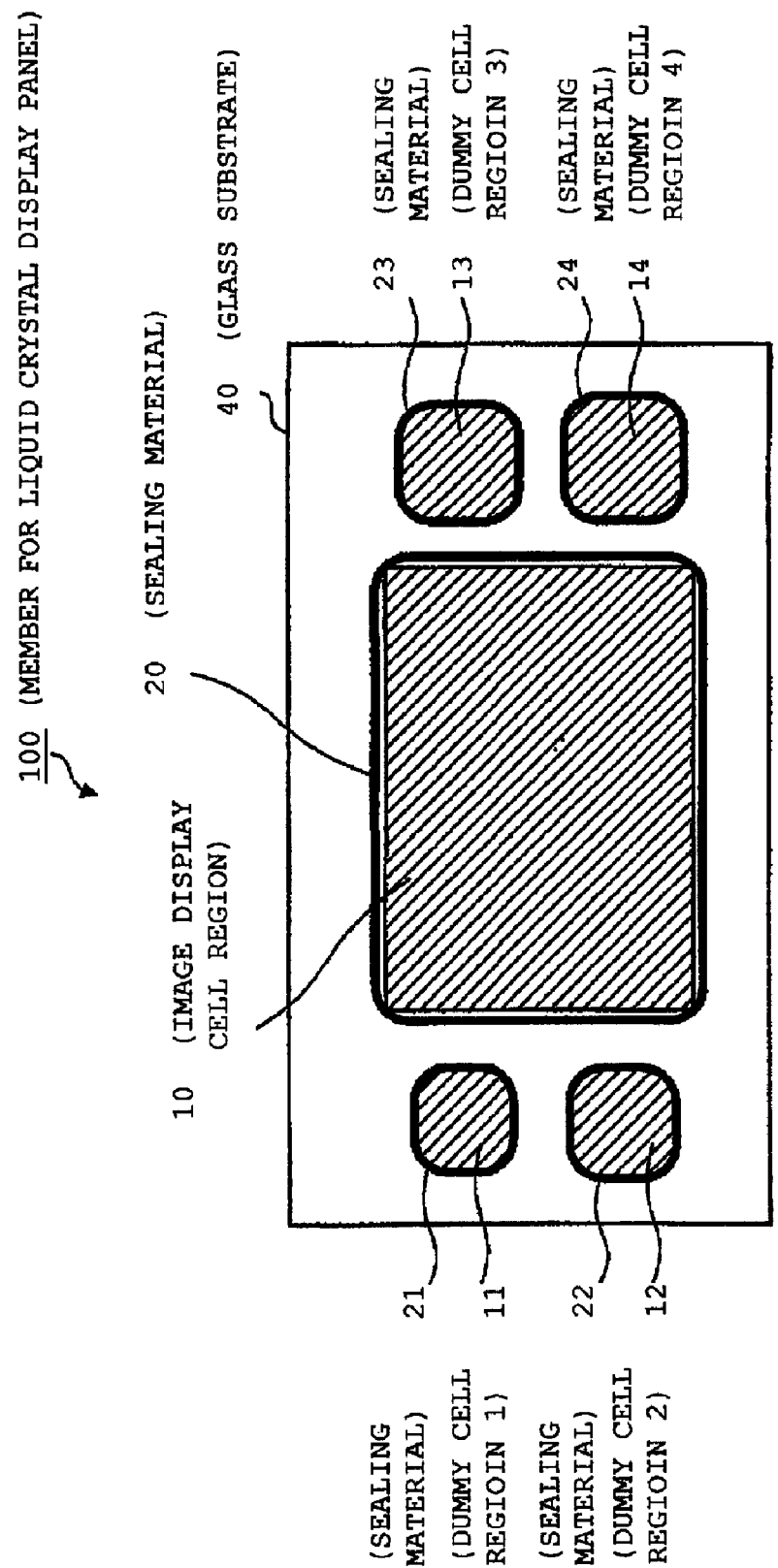
FIG. 1 is a view for explaining a member for a liquid crystal display panel.

Referring now to FIG. 1 there is described in more detail a preferred embodiment of the present invention. FIG. 1 is a view for explaining a member for a liquid crystal display panel, to which this embodiment is applied. A member 100 for the liquid crystal display panel, which is shown in FIG. 1, includes a glass substrate 40, an image display cell region 10 formed on the glass substrate 40, and a dummy cell region 1 (11), dummy cell region 2 (12), dummy cell region 3 (13) and dummy cell region 4 (14), which are individually formed in a periphery of the image display cell region 10. The member 100 includes a sealing material 20 surrounding the periphery of the image display cell region 10, a sealing material 21 surrounding the dummy cell region 1 (11), a sealing material 22 surrounding the dummy cell region 2 (12), a sealing material 23 surrounding the dummy cell region 3 (13), and a sealing material 24 surrounding the dummy cell region 4 (14).

Respective pixels of the image display cell region 10 are designed by a known method such that the image display cell region 10 functions as a CF substrate provided with color filters and electrodes or as an array substrate provided with TFTs and pixel electrodes. Pixels of the four dummy cell regions 1 to 4 (11 to 14) are designed similarly to the pixels of the image display cell region 10 except that extraction electrodes to the outsides of the respective regions are not provided. Although not illustrated, columnar spacers having a predetermined height are formed in order to maintain a gap in liquid crystal display cells molded by stacking the CF substrate and the array substrate on each other. The image display cell region 10 is formed on a product area of the glass substrate 40 cut in a subsequent step for arrangement of a product figure thereof. The four dummy cell regions 1 to 4 (11 to 14)

are provided on portions other than the product area of the glass substrate 40, on which the image display cell region 10 is formed.

Representative glass for use in the glass substrate 40 is not limited to, for example, soda lime glass, single plate glass, bent glass, tempered glass, laminated glass, double glass, and glass for mirror. Preferred sealing materials 20 to 24, include for example, ultraviolet curing resin, which is adhesive for use in the case of stacking the CF substrate and the array substrate. The sealing materials 20 to 24 are chosen for partitioning spaces in which the liquid crystal is sealed among the CF substrate, the array substrate and the image display cell region 10 or among the CF substrate, the array substrate and the four dummy cell regions 1 (11) to 4 (14).

The four dummy cell regions 1 (11) to 4 (14) are preferably formed of squares, for example, with a length of each side ranging from 10 to 20 mm such that an area of a portion surrounded by each of the sealing materials 21 to 24 differs from the others. As described later, the same amounts of crystal are sealed in the respective cells. The areas of the four dummy cell region 1 (11), the dummy cell region 2 (12), the dummy cell region 3 (13) and the dummy cell region 4 (14) get increased in this order. Note that a shape of the four dummy cell regions 1 (11) to 4 (14) is not limited to the square, and that a rectangle, a circle and any other shape can be employed. The number of dummy cell regions is not particularly limited, and can be appropriately set in accordance with a size of the glass substrate 40 and a size of the product area.

Usually, a blank that is not the product area occurs on the glass substrate 40 in many cases. A large number of dummy cell regions in each of which the area surrounded by the sealing material is different from the others are provided in such a blank portion, and thus sensitivity to a cell gap margin for the product of the liquid crystal display panel is increased. When the width of the blank portion is narrow, a method of elongating the shape of the dummy cell regions is possible, and a method of providing the glass substrates 40 in which the areas of the dummy cell regions are changed every several pieces is also possible. Note that, when there is no blank portion on the glass substrate 40, for example, such small dummy cell regions as described above can be formed in the product areas of defective substrates which have gone out of specifications, and sampling can be performed as appropriate.

As described later, in the image display cell region 10 formed on the product area and in the four dummy cell regions 1 (11) to 4 (14), an image display cell and dummy cells in which the liquid crystal is sealed are formed, respectively. These cells are formed in a manner that the liquid crystal is dropped by a liquid crystal dispenser or the like and the CF substrate and the array substrate are bonded together in vacuum. On the image display cell region 10 and one dummy cell region (for example, the dummy cell region 2 (12)), liquid crystal of which amounts per unit area are equal to each other is dropped and coated individually. On the three remaining dummy cell regions (the dummy cell region 1 (11), the dummy cell region 3 (13) and the dummy cell region 4 (14)), liquid crystal of which amounts are equal to that for the dummy cell region 2 (12) is dropped and coated individually. The states of the four dummy cells formed by having the liquid crystal sealed therein are then monitored. With regard to the respective dummy cells, it can be easily confirmed that bubbles remain in a dummy cell in which a drop amount of the liquid crystal is small, and that a gap defect occurs in a dummy cell in which the drop amount of the liquid crystal is large. The gap defect can be confirmed by yellow mode or blue mode display.

Referring to FIGS. 2(a) to 2(f) there are views for explaining a method of manufacturing a liquid crystal display panel according to another embodiment of the present invention. First, in a sealing material coating step in FIG. 2(a), the following are performed. On the glass substrate on which the image display cell region 10 and the four dummy cell regions 1 (11) to 4 (14) are designed, a CF substrate 41 provided with the color filters and the electrodes (or an array substrate provided with the TFTs and the pixel electrodes) is formed by known methods such as PI printing, firing, rubbing and cleaning. A photo-curing sealing material 20 is then coated on the CF substrate 41 by a dispenser 51, and surrounds the image display cell region 10. In a similar manner, sealing materials 21 to 24 are coated on the CF substrate 41, and surround the four dummy cell regions 1 (11) to 4 (14), respectively. In this case, the pixels are designed similarly on both of the image display cell region 10 formed on the product area and the four dummy cell regions 1 (11) to 4 (14) formed in a periphery thereof, and similar step differences are expressed on both. Note that the extraction electrodes are not provided for the dummy cells because it is not necessary to drive the dummy cells. The columnar spacers are formed similarly in both of the image display cell region and the dummy cell regions.

Figure 2:
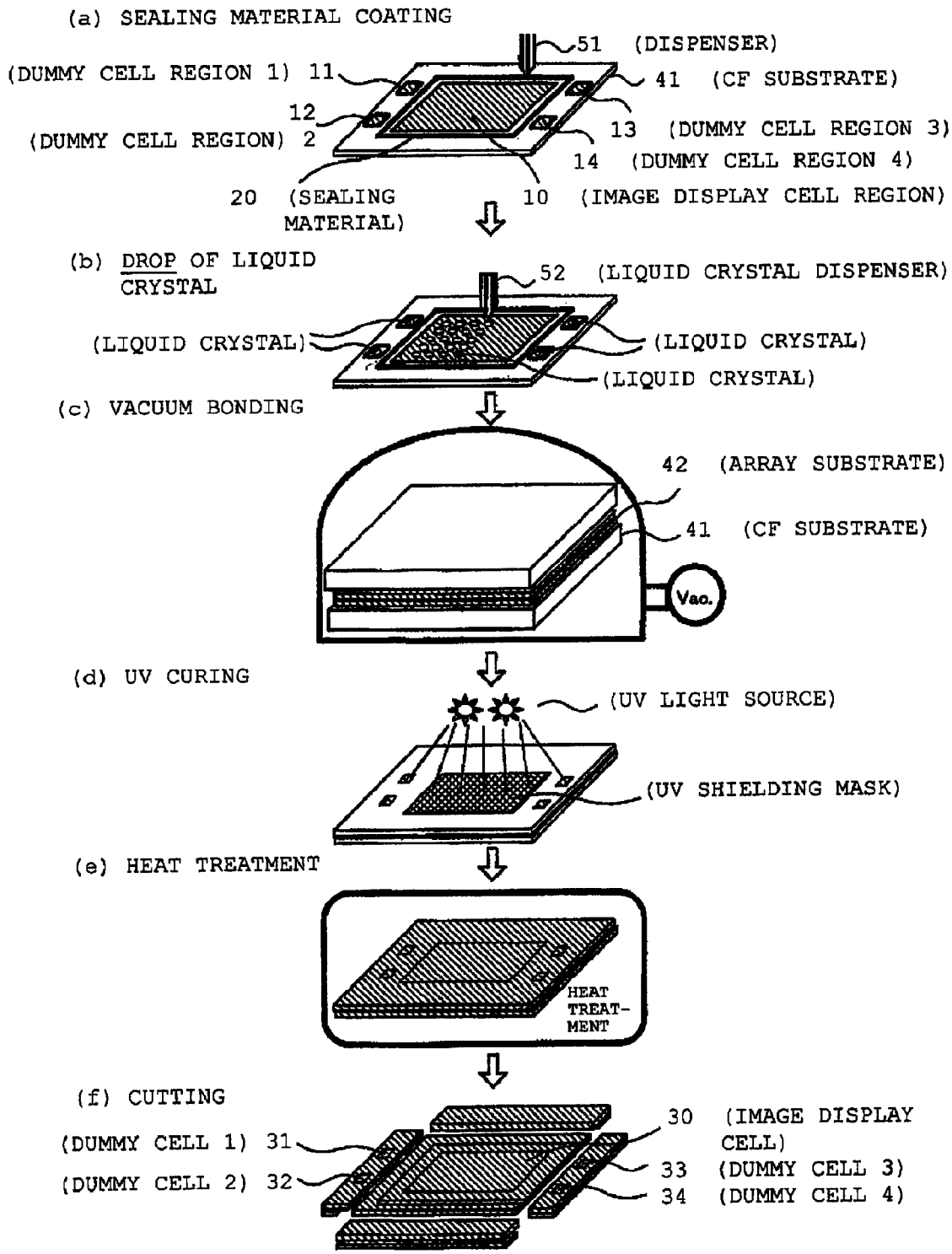
FIGS. 2(a) to 2(f) are views for explaining a method of manufacturing the liquid crystal display panel.

Next, in a liquid crystal dropping step in FIG. 2(b), the liquid crystal cell is dropped on the image display cell region 10 and the four dummy cell regions 1 (11) to 4 (14) by a liquid crystal dispenser 52. In this case, the liquid crystal of which amounts per unit area are equal to each other is dropped individually on the image display cell region 10 and the dummy cell region 2 (12). On the dummy cell region 1 (11), the dummy cell region 3 (13) and the dummy cell region 4 (14), the liquid crystal of which amounts are equal to that for the dummy cell region 2 (12) is dropped.

Subsequently, in a vacuum bonding step, the CF substrate 41 and the array substrate 42 are bonded together in vacuum. Next, in a UV curing step in FIG. 2(d), the sealing materials are cured by UV irradiation. Note that the UV irradiation is performed in vacuum, the atmosphere or inert gas. In the case of the UV irradiation, portions of the image display cell region 10 and four dummy cell regions 1 (11) to 4 (14) are covered with UV-shielding masks. In a heat treatment step in FIG. 2(e), a heat treatment is performed for curing the sealing materials, the image display cell is formed on the image display cell region 10, and the four dummy cells are formed in the four dummy cell regions 1 (11) to 4 (14), respectively. As described later, by means of a process inspection, results of monitoring states of these four dummy cells in which the liquid crystal is sealed are subjected to feedback for adjusting the drop amounts of liquid crystal, and actions to optimize the drop amounts of the liquid crystal in the liquid crystal dropping step are taken. Finally, in a cutting step in FIG. 2(f), the resultant object is cut into the product area on which the image display cell 30 is formed and the portions on which the four dummy cells 1 (31) to 4 (34) are formed.

FIGS. 3(a) to 3(d) are views for explaining the states of the dummy cells. FIG. 3(a) shows the dummy cell 1 (31), FIG. 3(b) shows the dummy cell 2 (32), FIG. 3(c) shows the dummy cell 3 (33), and FIG. 3(d) shows the dummy cell 4 (34). The dummy cell 1 (31) shown in FIG. 3(a) shows a state where the amount of liquid crystal dropped on the cell is too large for an area of the portion surrounded by the sealing material 21. As shown in FIG. 3(a), internal pressure of the cell is changed to cause a gap defect because the amount of liquid crystal sealed in the dummy cell 1 (31) is too large. The dummy cell 2 shown in FIG. 3(b) shows a state where the amount of liquid crystal dropped on the cell is proper for an area of the portion surrounded by the sealing material 22. As shown in FIG. 3(*b*), the internal pressure of the cell is maintained in a proper state.

The dummy cell 3 (33) shown in FIG. 3(*c*) shows a state where the amount of liquid crystal dropped on the cell is too small for an area of the portion surrounded by the sealing material 23. As shown in FIG. 3(*c*), the internal pressure of the cell is changed to cause bubbles because the amount of liquid crystal sealed in the dummy cell 3 (33) is too small. The dummy cell 4 (34) shown in FIG. 3(*d*) shows a state of the case where the amount of liquid crystal dropped on the cell is far too small for an area of the portion surrounded by the sealing material 24. As shown in FIG. 3(*d*), large bubbles occur in the dummy cell 4 (34).

As shown in FIGS. 3(*a*) to 3(*d*), though the amounts of liquid crystal sealed in the respective dummy cells are the same, the areas surrounded by the sealing materials are different from one another, and accordingly, the internal pressure of each dummy cell changes from those of the others. Therefore, the state of the case where the amount of liquid crystal is too large as in the dummy cell 1 (31) in FIG. 3(*a*) and the states of the cases where the amount of liquid crystal is short as in the dummy cell 3 (33) in FIG. 3(*c*) and the dummy cell 4 (34) in FIG. 3(*d*) are monitored.

Relationships between the aforementioned states of the plurality of dummy cells and quality related to the gap margin of the liquid crystal cell of an actual product are obtained in advance prior to launching of the product, and the aforementioned states of the dummy cells are confirmed at the time of actual mass production, thus making it possible to adjust the drop amount of liquid crystal and to estimate the quality of the product. This is illustrated by the following example.

A state of the dummy cell, when a product having the proper image display cell is obtained, is shown in the dummy cell 2 (32) in FIG. 3(*b*). However, at the time of mass production, the gap defect occurs in the dummy cell 2 (32), and the bubbles which have occurred in the dummy cell 3 (33) in FIG. 3(*c*) disappear. In this case, it can be determined that the drop amount of liquid crystal becomes a little too large, and an action to reduce the drop amount of liquid crystal can be taken. Note that in order to improve sensitivity for monitoring the states of the dummy cells, it is preferable to provide the plurality of dummy cells in which the areas surrounded by the sealing materials are different from one another.

Moreover, for example, there are variations in height of the columnar spaces provided between the CF substrate and the array substrate, variations in coating thickness of a film surface formed on each of the CF substrate and the array substrate, and variations in drop amount of liquid crystal. However, changes with time of these variations are relatively gentle. Therefore, the drop amounts of liquid crystal are adjusted appropriately in accordance with the results of monitoring the states of the dummy cells in the mass production process of the products of the liquid crystal display panels, thus making it possible to timely manage the products without producing products defective in quality. Note that a method of monitoring the states of the dummy cells may be performed manually as a sampling inspection. Alternatively, a system of automatically adjusting the drop amounts of liquid crystal by use of image processing is also possible.

Figure 4:
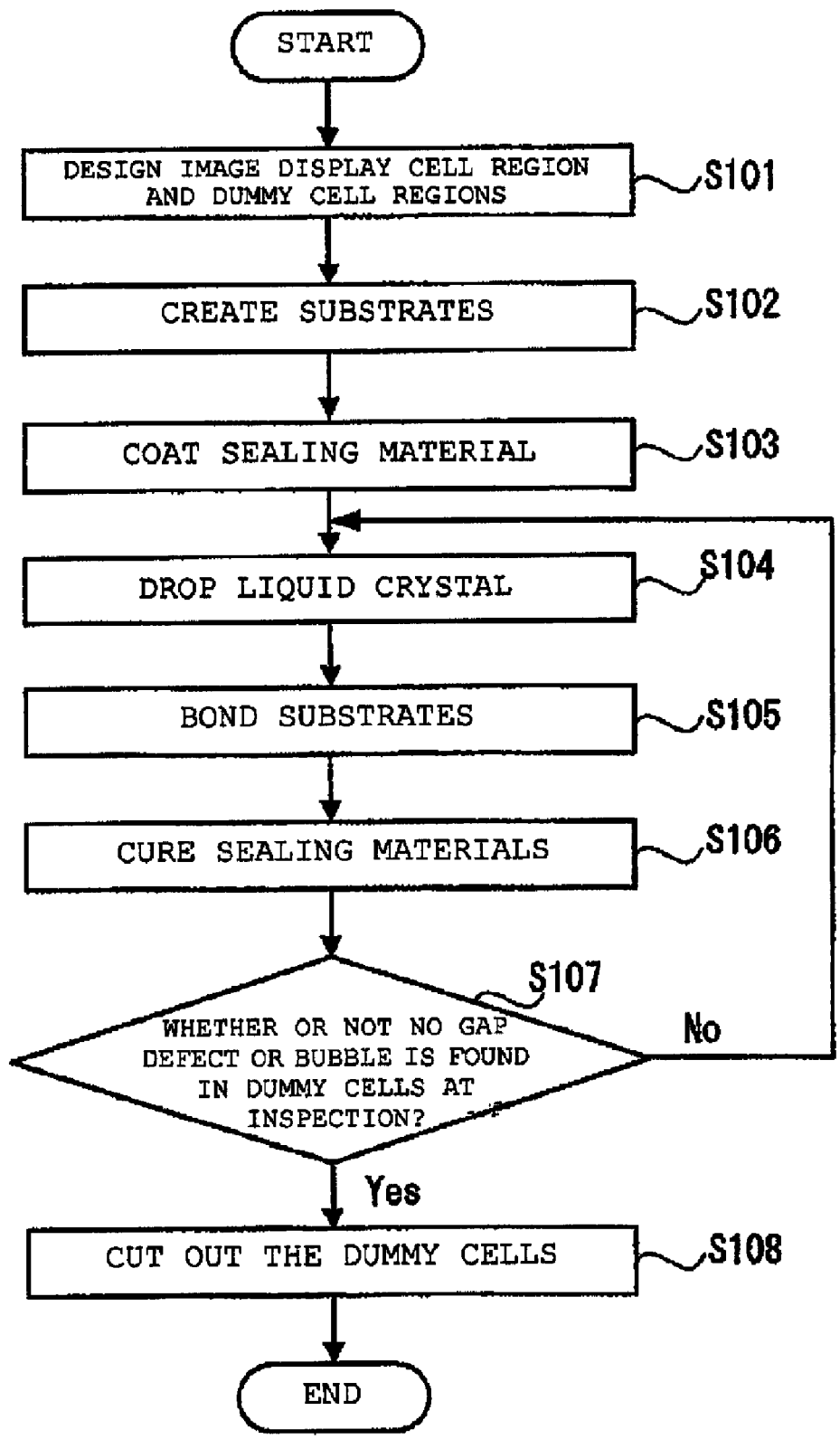
FIG. 4 is a flowchart showing a flow to adjust a drop amount of liquid crystal by monitoring the states of the dummy cells.

FIG. 4 is a flowchart showing a flow to adjust the drop amount of liquid crystal by monitoring the states of the dummy cells. First, the image display cell region and the dummy cell regions are designed on the substrate (Step 101). Typically, when the image display cell region is allocated with respect to the substrate size, a liquid crystal display (LCD) panel monitor has the blank in the periphery of the image display cell region that is the product area. Therefore, the dummy cell regions are allocated to the blank portion in the periphery of the image display cell region.

Next, the substrates are prepared (Step 102). Specifically, the CF substrate provided with the color filters and the electrodes and the array substrate provided with the TFTs and the pixel electrodes are formed by known methods. In this case, the pixels are designed similarly in both of the image display cell region formed on the product area and the dummy cell regions formed in the periphery thereof. Note that the extraction electrodes are not provided for the dummy cells because it is not necessary to drive the dummy cells. Moreover, on the dummy cells, the similar step differences to those of the image display cell region are expressed.

The columnar spacers are formed similarly in both of the image display cell region and the dummy cell regions. Next, the photo-curing sealing materials are coated on the CF substrate, and individually surround the image display cell region and the dummy cell regions (Step 103). Next, the liquid crystal is individually dropped on the image display cell region and the dummy cell regions (Step 104). On one of the plurality of dummy cell regions, the liquid crystal of which amount per unit area is equal to that of the image display cell region is dropped, and on the remaining dummy cell regions, the liquid crystal of which amounts are equal to that of the aforementioned one dummy cell region is dropped. Note that it is preferable to design the areas of the dummy cell regions to such proper areas that one shot of the liquid crystal dropped on each of the image display cell region and the dummy cell regions may correspond to the coating amount of the liquid crystal coated on each dummy cell region.

Subsequently, the CF substrate and the array substrate are bonded together in vacuum (Step 105). By stacking the two substrates on each other, the liquid crystal becomes spread entirely in each of the image display cell region and the dummy cell regions, which is surrounded by the sealing material. Thus, the liquid crystal is sealed in the individual cell regions, and the image display cell and the dummy cells are formed individually. The sealing materials are then cured by UV irradiation (Step 106). The UV irradiation may be performed in vacuum, the atmosphere or inert gas. Moreover, a heat treatment may be further performed according to needs.

Next, the states of the dummy cells formed in the periphery of the image display cell are monitored by means of a process inspection (Step 107). Specifically, when the gap defect occurs because the amount of liquid crystal sealed in the dummy cell is too large or when the bubbles occur because the amount of liquid crystal is short as a result of monitoring the state of each dummy cell, the feedback for adjusting the drop amount of liquid crystal is performed, and the drop amount of liquid crystal is decreased or increased. Finally, the portion other than the product area on which the image display cell region is formed is cut out (Step 108).

As described above, the states of the dummy cells formed under the designing, material and process conditions similar to those for the image display cell region that is the product area are monitored. Thus, it is possible to timely confirm/assure the quality of the product in the manufacturing process of the liquid crystal display panel. Moreover, the aforementioned steps will not be reflected in the cost of the substrates, and can be achieved by use of only a few low cost materials for the sealing and the liquid crystal. Also, only a short time is required for the described methods. Accordingly, these steps are realizable in the actual mass production process.

Note that the plurality of dummy cells can adopt various different modes according to needs, for example, in which the number of columnar spacers are changed, and the pixel design is changed.

Although the preferred embodiment of the present invention has been described in detail, it should be understood that various changes, substitutions and alternations can be made therein without departing from spirit and scope of the inventions as defined by the appended claims.

What is claimed is:

1. A member for a liquid crystal display panel formed by bonding together a first substrate and a second substrate and by sealing liquid crystal in a gap between the first substrate and the second substrate, the member comprising:
    an image display cell region on which an image is displayed by the liquid crystal, the image display cell region being formed on a substantial center portion in a product area of the first and second substrates;
    a first sealing material surrounding the image display cell region, the image display cell having the liquid crystal sealed therein;
    a dummy cell region for inspecting a state where the liquid crystal is sealed, the dummy cell region being individually formed in a periphery of the image display cell region on a non-product area of the first and second substrates, the dummy cell having the liquid crystal sealed therein, the dummy cell region not displaying the image; and
    a second sealing material surrounding the dummy cell region, wherein the dummy cell region and the image display cell region are separated from each other by a distance from the product area to the non-product area and wherein the liquid crystal sealed in the dummy cell region is not in contact with the first sealing material.

2. The member for a liquid crystal display panel according to claim 1, wherein a plurality of the dummy cell regions are provided in the periphery of the image display cell region, wherein each of the dummy cell regions are surrounded by a third sealing material.

3. The member for a liquid crystal display panel according to claim 2, wherein the plurality of dummy cell regions have areas different from one another.

4. The member for a liquid crystal display panel according to claim 1, wherein both the image display cell region and the dummy cell region are formed by a similar pixel design.

5. A member for a liquid crystal display panel formed by sealing liquid crystal in a gap between a first substrate and a second substrate, the member comprising:
    an image display cell formed on a substantial center portion in a product area of the first and second substrates;
    a sealing material surrounding the image display cell, the image display cell having the liquid crystal sealed therein;
    a plurality of dummy cells having liquid crystal sealed therein and having areas different from one another, the dummy cells being formed in a portion other than a portion of the image display cell in a non-product area of the first and second substrates, the dummy cells not displaying an image, wherein the dummy cells and the image display cell are separated from each other by a distance from the product area to the non-product area and wherein the liquid crystal sealed in the dummy cells is not in contact with the sealing material.

6. A member for a liquid crystal display panel according to claim 5, wherein amounts of the sealed liquid crystal in the plurality of dummy cells having the liquid crystal sealed therein are equal to one another.

7. The member for a liquid crystal display panel according to claim 5, wherein a state of the image display cell is estimated based on states of the plurality of dummy cells having the liquid crystal sealed therein.

* * * * *